(12) United States Patent
Kim et al.

(10) Patent No.: US 11,437,650 B2
(45) Date of Patent: Sep. 6, 2022

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Chem, Ltd., Seoul (KR)

(72) Inventors: Hyun Seung Kim, Daejeon (KR); Chul Haeng Lee, Daejeon (KR); Jeong Woo Oh, Daejeon (KR)

(73) Assignee: LG Energy Solution, Ltd.

(*) Notice: Subject to any disclaimer, the term of this patent is extended or adjusted under 35 U.S.C. 154(b) by 290 days.

(21) Appl. No.: 16/765,021

(22) PCT Filed: Apr. 10, 2019

(86) PCT No.: PCT/KR2019/004260
§ 371 (c)(1),
(2) Date: May 18, 2020

(87) PCT Pub. No.: WO2019/199047
PCT Pub. Date: Oct. 17, 2019

(65) Prior Publication Data
US 2020/0365946 A1 Nov. 19, 2020

(30) Foreign Application Priority Data

Apr. 11, 2018 (KR) .................. 10-2018-0042227
Apr. 8, 2019 (KR) .................. 10-2019-0040618

(51) Int. Cl.
*H01M 10/0569* (2010.01)
*H01M 10/0525* (2010.01)
(Continued)

(52) U.S. Cl.
CPC ... *H01M 10/0569* (2013.01); *H01M 10/0525* (2013.01); *H01M 10/0567* (2013.01); *H01M 10/0568* (2013.01); *H01M 2300/0028* (2013.01)

(58) Field of Classification Search
None
See application file for complete search history.

(56) References Cited

U.S. PATENT DOCUMENTS

2008/0102377 A1   5/2008   Abe et al.
2014/0050991 A1   2/2014   Kim
(Continued)

FOREIGN PATENT DOCUMENTS

JP   H04016932 B2   3/1992
JP   2003229169 A   8/2003
(Continued)

OTHER PUBLICATIONS

International Search Report for Application No. PCT/KR2019/004260 dated Jul. 19, 2019, 2 pages.
(Continued)

*Primary Examiner* — Eli S Mekhlin
(74) *Attorney, Agent, or Firm* — Lerner, David, Littenberg, Krumholz & Mentlik, LLP (57) ABSTRACT

A non-aqueous electrolyte solution and a lithium secondary battery including the same are disclosed herein. In some embodiments, a non-aqueous electrolyte solution includes a lithium salt, an organic solvent, and a compound represented by Formula 1 as an additive. The compound has an excellent effect of removing a decomposition product generated from the lithium salt in the electrolyte solution. In some embodiments, a lithium secondary battery including the non-aqueous electrolyte solution has improved high-temperature storage characteristics by alleviating self-discharge.

10 Claims, 2 Drawing Sheets

(51) Int. Cl.
*H01M 10/0567* (2010.01)
*H01M 10/0568* (2010.01)

(56) References Cited

U.S. PATENT DOCUMENTS

| | | | |
|---|---|---|---|
| 2017/0040650 A1 | | 2/2017 | Schmitz et al. |
| 2018/0040916 A1* | | 2/2018 | Tsuda .................... H01M 4/386 |
| 2018/0198157 A1 | | 7/2018 | Yu et al. |

FOREIGN PATENT DOCUMENTS

| | | | |
|---|---|---|---|
| JP | 2004234953 A | 8/2004 |
| JP | 2006351242 A | 12/2006 |
| JP | 4089235 B2 | 5/2008 |
| JP | 2008262900 A | 10/2008 |
| JP | 2016131059 A | 7/2016 |
| KR | 100370384 B1 | 1/2003 |
| KR | 100645775 B1 | 11/2006 |
| KR | 20070089958 A | 9/2007 |
| KR | 20140024079 A | 2/2014 |
| KR | 20170034333 A | 3/2017 |
| KR | 20170110521 A | 10/2017 |

OTHER PUBLICATIONS

Extended European Search Report including Written Opinion for Application No. 19784321.2 dated Feb. 10, 2021, pp. 1-7.

* cited by examiner

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2019/004260, filed on Apr. 10, 2019, which claims priority from Korean Patent Application Nos. 10-2018-0042227, filed on Apr. 11, 2018, and 10-2019-0040618, filed on Apr. 8, 2019, the disclosures of which are incorporated by reference herein.

TECHNICAL FIELD

The present invention relates to a non-aqueous electrolyte solution for a lithium secondary battery, which includes a non-aqueous electrolyte solution additive having an excellent effect of removing a decomposition product generated from a lithium salt, and a lithium secondary battery in which high-temperature storage characteristics are improved by including the same.

BACKGROUND ART

There is a need to develop technology for efficiently storing and utilizing electrical energy as personal IT devices and computer networks are developed with the development of information society and the accompanying dependency of society as a whole on the electrical energy is increased.

Among the technologies developed for this purpose, a technology based on secondary batteries is the most suitable technology for various applications. Since a secondary battery may be miniaturized to be applicable to a personal IT device and may be applied to an electric vehicle and a power storage device, there emerges an interest in the secondary battery. Among these secondary battery technologies, lithium ion batteries, which are battery systems having the theoretically highest energy density, are in the spotlight, and are currently being used in various devices.

Instead of directly applying lithium metal to an electrode, the lithium ion battery is composed of a positive electrode formed of a transition metal oxide containing lithium, a negative electrode formed of a carbon-based material such as graphite capable of storing lithium, an electrolyte solution that becomes a medium for transferring lithium ions, and a separator.

Among them, a significant amount of research on the electrolyte solution has been conducted while the electrolyte solution is known as a component that greatly affects stability and safety of the battery.

The electrolyte solution for a lithium ion battery is composed of a lithium salt, an organic solvent dissolving the lithium salt, and a functional additive, wherein proper selection of these components is important to improve electrochemical properties of the battery. As a representative lithium salt currently used, $LiPF_6$, $LiBF_4$, LiFSI (lithium bis(fluorosulfonyl)imide, $LiN(SO_2F)_2$), LiTFSI (lithium bis(trifluoromethanesulfonyl)imide, $LiN(SO_2CF_3)_2$), or LiBOB (lithium bis(oxalate) borate, $LiB(C_2O_4)_2$) is being used, and, with respect to the organic solvent, an ester-based organic solvent or ether-based organic solvent is being used.

The lithium ion battery is disadvantageous in that performance degrades because an increase in resistance and a decrease in capacity occur during charge and discharge or storage at high temperatures. In this case, one of causes of such problem suggested is a side reaction caused by deterioration of the electrolyte solution at high temperatures, particularly deterioration due to decomposition of the lithium salt. In a case in which a by-product of the salt is activated and then decomposes films formed on surfaces of the positive electrode and the negative electrode, there is a problem of decreasing passivation ability of the film, and, as a result, this may cause additional decomposition of the electrolyte solution and accompanying self-discharge.

Particularly, with respect to a negative electrode among electrode materials of the lithium ion battery, a graphite-based negative electrode is mostly used, wherein, with respect to graphite, its operating potential is 0.3 V (vs. $Li/Li^+$) or less which is lower than an electrochemical stability window of an electrolyte solution used in the lithium ion battery. Thus, the currently used electrolyte solution is first reduced and decomposed. The reduced and decomposed product transmits lithium ions, but forms a solid electrolyte interphase (SEI) that suppresses the additional decomposition of the electrolyte solution.

However, in a case in which the SEI does not have sufficient passivation ability to such an extent that it may suppress the additional decomposition of the electrolyte solution, since the electrolyte solution is additionally decomposed during storage, the charged graphite is self-discharged, and as a result, there is a disadvantageous in that a potential of the battery is reduced.

For example, an acid, such as HF and $PF_5$, produced by pyrolysis of $LiPF_6$, a lithium salt widely used in the lithium ion battery, deteriorates a film or a surface of the electrode. As a result, if the surface of the electrode is deteriorated, dissolution of transition metal occurs at the positive electrode to increase resistance, and capacity may be reduced by loss of redox centers. Furthermore, since the metal ions thus dissolved are electrodeposited on the negative electrode, irreversible capacity is increased by consumption of electrons due to the electrodeposition of the metal and the additional decomposition of the electrolyte, and thus, cell capacity may not only be reduced, but also the resistance may be increased and the graphite negative electrode may be self-discharged.

Therefore, recently, in order to suppress the damage and maintain the passivation ability of the SEI at high temperatures, there is proposed a method which may introduce an electrolyte solution additive containing a functional group that may be reduction-decomposed well in the electrolyte solution, or may remove factors that may affect the passivation ability, for example, decomposition products (HF, $PF_5$, etc.) of the lithium salt generated due to heat or moisture.

PRIOR ART DOCUMENT

Korean Patent Application Laid-open Publication No. 2017-0034333

DISCLOSURE OF THE INVENTION

Technical Problem

An aspect of the present invention provides a non-aqueous electrolyte solution for a lithium secondary battery which includes a non-aqueous electrolyte solution additive having an excellent effect of removing a decomposition product generated from a lithium salt which may be generated in the non-aqueous electrolyte solution.

Another aspect of the present invention provides a lithium secondary battery in which high-temperature storage characteristics are improved by including the non-aqueous electrolyte solution for a lithium secondary battery.

Technical Solution

According to an aspect of the present invention, there is provided a non-aqueous electrolyte solution for a lithium secondary battery including a lithium salt, an organic solvent, and a compound represented by the following Formula 1 as an additive.

[Formula 1]

In Formula 1, $R_1$ to $R_6$ are each independently hydrogen or a substituted or unsubstituted alkyl group having 1 to 10 carbon atoms, and $R_7$ is a substituted or unsubstituted alkyl group having 1 to 10 carbon atoms.

In the compound represented by Formula 1, $R_1$ and $R_5$ are hydrogen, $R_3$ and $R_4$ are each independently a substituted or unsubstituted alkyl group having 1 to 7 carbon atoms, $R_2$ and $R_6$ are each independently hydrogen or a substituted or unsubstituted alkyl group having 1 to 5 carbon atoms, and $R_7$ is a substituted or unsubstituted alkyl group having 1 to 7 carbon atoms.

Specifically, in the compound represented by Formula 1, $R_1$ and $R_5$ are hydrogen, $R_3$ and $R_4$ are each independently a substituted or unsubstituted alkyl group having 1 to 5 carbon atoms, $R_2$ and $R_6$ are each independently hydrogen or a substituted or unsubstituted alkyl group having 1 to 3 carbon atoms, and $R_7$ is a substituted or unsubstituted alkyl group having 1 to 5 carbon atoms.

More specifically, in the compound represented by Formula 1, $R_1$, $R_2$, $R_5$, and $R_6$ are hydrogen, $R_3$ and $R_4$ are each independently a substituted or unsubstituted alkyl group having 1 to 3 carbon atoms, and $R_7$ is a substituted or unsubstituted alkyl group having 1 to 3 carbon atoms.

The compound represented by Formula 1 may include a compound represented by Formula 1a below.

[Formula 1a]

The additive may be included in an amount of 0.1 wt % to 2 wt %, for example, 0.1 wt % to 1.7 wt % based on a total weight of the non-aqueous electrolyte solution.

According to another aspect of the present invention, there is provided a lithium secondary battery including the non-aqueous electrolyte solution of the present invention.

Advantageous Effects

According to the present invention, since HF and $PF_5$, which are formed as decomposition products of a lithium salt ($LiPF_6$) mainly used in a non-aqueous electrolyte solution, are scavenged by including a Lewis base compound as an electrolyte solution additive during the preparation of the non-aqueous electrolyte solution, passivation ability of a solid electrolyte interphase (SEI) may be maintained during high-temperature storage. Also, since a self-discharge phenomenon due to the dissolution of a positive electrode and the destruction of the SEI on the negative electrode is alleviated by including the non-aqueous electrolyte solution including the Lewis base compound as an additive, a lithium secondary battery having improved high-temperature storage performance may be prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

In a lithium secondary battery, since films with passivation ability are formed on surfaces of a positive electrode and a negative electrode while a non-aqueous electrolyte solution is decomposed during initial charge and discharge, high-temperature storage characteristics may be improved. However, such films may be degraded by an acid, such as HF and $PF_5$, produced by pyrolysis of $LiPF_6$, a lithium salt widely used in a lithium ion battery. Surface resistance of the electrode is increased due to a change in structure of the surface while dissolution of transition metal elements occurs at the positive electrode due to the acid attack, and capacity may be reduced because theoretical capacity is reduced while the metallic elements, as redox centers, are lost. Also, since the transition metal ions thus dissolved are electrodeposited on the negative electrode reacting in a strong reduction potential range, the transition metal ions not only consume electrons, but also destruct a solid electrolyte interphase (SEI) when electrodeposited. Accordingly, resistance of the negative electrode is increased while the surface of the negative electrode is exposed, and an additional electrolyte decomposition reaction occurs. As a result, there is a limitation in that capacity of a cell is continuously reduced while irreversible capacity is increased.

Thus, the present invention attempts to provide a non-aqueous electrolyte solution, which may prevent degradation of the SEI during high-temperature storage or dissolution of transition metal at the positive electrode by including a Lewis base compound, as a non-aqueous electrolyte solution additive, to remove an acid caused by the decomposition of a lithium salt, and a lithium secondary battery including the same.

Non-aqueous Electrolyte Solution for Lithium Secondary Battery

Specifically, in an embodiment of the present invention, provided is a non-aqueous electrolyte solution for a lithium secondary battery including a lithium salt, an organic solvent, and a compound represented by the following Formula 1 as an additive.

[Formula 1]

In Formula 1, $R_1$ to $R_6$ are each independently hydrogen or a substituted or unsubstituted alkyl group having 1 to 10 carbon atoms, and $R_7$ is a substituted or unsubstituted alkyl group having 1 to 10 carbon atoms.

(1) Lithium Salt

First, in the non-aqueous electrolyte solution for a lithium secondary battery according to the embodiment of the present invention, any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$ as an anion. Specifically, the lithium salt may include at least one selected from the group consisting of LiCl, LiBr, LiI, $LiBF_4$, $LiClO_4$, $LiAlO_4$, $LiAlCl_4$, $LiPF_6$, $LiSbF_6$, $LiAsF_6$, $LiB_{10}Cl_{10}$, LiBOB($LiB(C_2O_4)_2$), $LiCF_3SO_3$, LiTFSI ($LiN(SO_2CF_3)_2$), LiFSI($LiN(SO_2F)_2$), $LiCH_3SO_3$, $LiCF_3CO_2$, $LiCH_3CO_2$, and LiBETI ($LiN(SO_2CF_2CF_3)_2$). Specifically, the lithium salt may include a single material selected from the group consisting of $LiBF_4$, $LiClO_4$, $LiPF_6$, LiBOB($LiB(C_2O_4)_2$), $LiCF_3SO_3$, LiTFSI ($LiN(SO_2CF_3)_2$), LiFSI($LiN(SO_2F)_2$), and LiBETI ($LiN(SO_2CF_2CF_3)_2$), or a mixture of two or more thereof.

The lithium salt may be appropriately changed in a normally usable range but may be included in a concentration of 0.8 M to 4.0 M, for example, 1.0 M to 3.0 M in the electrolyte solution to obtain an optimum effect of forming a film for preventing corrosion of a surface of an electrode.

In a case in which the concentration of the lithium salt is less than 0.8 M, an effect of improving low-temperature output and cycle characteristics during high-temperature storage of the lithium secondary battery is insignificant, and, in a case in which the concentration of the lithium salt is greater than 4.0 M, electrolyte solution impregnability may be reduced due to an increase in viscosity of the non-aqueous electrolyte solution.

(2) Organic Solvent

In the non-aqueous electrolyte solution for a lithium secondary battery according to the present specification, the organic solvent may include a cyclic carbonate-based organic solvent, a linear carbonate-based organic solvent, or a mixed organic solvent thereof.

The cyclic carbonate-based organic solvent is an organic solvent which may well dissociate the lithium salt in the electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

Also, the linear carbonate-based organic solvent is an organic solvent having low viscosity and low permittivity, wherein, typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include ethyl methyl carbonate (EMC).

The organic solvent may further include at least one ester-based organic solvent selected from the group consisting of a linear ester-based organic solvent and a cyclic ester-based organic solvent in at least one carbonate-based organic solvent selected from the group consisting of the cyclic carbonate-based organic solvent and the linear carbonate-based organic solvent to prepare an electrolyte solution having high ionic conductivity.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

The cyclic ester-based organic solvent may include at least one organic solvent selected from the group consisting of γ-butyrolactone, γ-valerolactone, γ-caprolactone, σ-valerolactone, and ε-caprolactone.

The organic solvent may be used by adding an organic solvent typically used in an electrolyte solution for a lithium secondary battery without limitation, if necessary. For example, the organic solvent may further include at least one organic solvent selected from an ether-based organic solvent, an amide-based organic solvent, and a nitrile-based organic solvent.

(3) Additive

The non-aqueous electrolyte solution for a lithium secondary battery of the present invention may include a compound represented by the following Formula 1 as an additive.

[Formula 1]

In Formula 1, $R_1$ to $R_6$ are each independently hydrogen or a substituted or unsubstituted alkyl group having 1 to 10 carbon atoms, and

$R_7$ is a substituted or unsubstituted alkyl group having 1 to 10 carbon atoms.

In this case, in the compound represented by Formula 1, $R_1$ and $R_5$ are hydrogen, $R_3$ and $R_4$ are each independently a substituted or unsubstituted alkyl group having 1 to 7 carbon atoms, $R_2$ and $R_6$ are each independently hydrogen or a substituted or unsubstituted alkyl group having 1 to 5 carbon atoms, and $R_7$ is a substituted or unsubstituted alkyl group having 1 to 7 carbon atoms.

Specifically, in the compound represented by Formula 1, $R_1$ and $R_5$ are hydrogen, $R_3$ and $R_4$ are each independently a substituted or unsubstituted alkyl group having 1 to 5 carbon atoms, $R_2$ and $R_6$ are each independently hydrogen or a substituted or unsubstituted alkyl group having 1 to 3 carbon atoms, and $R_7$ is a substituted or unsubstituted alkyl group having 1 to 5 carbon atoms.

More specifically, in the compound represented by Formula 1, $R_1$, $R_2$, $R_5$, and $R_6$ are hydrogen, $R_3$ and $R_4$ are each independently a substituted or unsubstituted alkyl group having 1 to 3 carbon atoms, and $R_7$ is a substituted or unsubstituted alkyl group having 1 to 3 carbon atoms.

A representative example of the compound represented by Formula 1 may be a compound represented by Formula 1a below.

[Formula 1a]

The compound represented by Formula 1 may be included in an amount of 0.1 wt % to 2 wt %, particularly 0.1 wt % to 1.7 wt %, and more particularly 0.5 wt % to 1.5 wt %, for example, 1 wt % to 1.5 wt % based on a total weight of the non-aqueous electrolyte solution.

In a case in which the compound represented by Formula 1 is included in an amount within the above range, a secondary battery having more improved overall performance may be prepared. For example, if the amount of the compound represented by Formula 1 is less than 0.1 wt %, HF or $PF_5$ may be initially removed, but the removal effect may be insignificant over time. Also, if the amount of the compound represented by Formula 1 is greater than 2.0 wt %, resistance of the secondary battery may be increased during high-temperature storage due to the occurrence of side reactions and by-products caused by the excessive amount of the additive.

Thus, in a case in which the compound represented by Formula 1 is included in an amount of 0.1 wt % or more to 2 wt % or less, particularly 0.1 wt % to 1.7 wt %, and more particularly 0.5 wt % to 1.5 wt %, for example, 1 wt % to 1.5 wt %, the additive may more effectively remove the acid, such as HF and $PF_5$, as a decomposition product of the lithium salt while suppressing disadvantages, such as a side reaction caused by the additive, capacity reduction, and resistance increase, as much as possible.

Since the compound represented by Formula 1 included as the electrolyte solution additive in the present specification is a Lewis base-based compound containing a C=O functional group, the compound represented by Formula 1 may easily scavenge a by-product which causes deterioration of the battery at high temperatures, for example, Lewis acid (e.g., HF or $PF_5$) generated by the decomposition of the lithium salt. As a result, since the degradation behavior due to a chemical reaction of the films on the surface of the positive electrode or the negative electrode caused by the Lewis acid may be suppressed, it is possible to prevent the additional decomposition of the electrolyte solution of the battery due to the destruction of the film, and, furthermore, high-temperature storage characteristics may be improved by alleviating self-discharge of the secondary battery. Particularly, the dissolution of the transition metal from the positive electrode may be suppressed by preventing the degradation of the film on the surface of the positive electrode.

Particularly, in the compound represented by Formula 1, an alkoxy group (—O—$R_7$) is bonded to an alkenylene group. Thus, an effect of pushing electrons to the C=O functional group contained in a parent structure by the alkoxy group is stronger than a compound not containing an alkoxy group such as a compound represented by Formula 2 or 3 below. Therefore, since oxygen of the C=O group may be more enriched with electrons to be easily bonded to the Lewis acid, an effect of scavenging the Lewis acid is better.

Also, since the compound represented by Formula 1 contains an alkyl group at a m-position of the alkenylene group, it is changed to a component which does not cause a side reaction in the battery, because a 1,4-reduction reaction takes precedence even if a reduction side reaction occurs in the battery. Therefore, it is advantageous in that a side reaction by the compound may be suppressed in comparison to the compound represented by Formula 3 containing an alkyl group at an o-position of the alkenylene group.

[Formula 2]

[Formula 3]

(4) Additional Additives

Furthermore, in order to prevent a non-aqueous electrolyte solution from being decomposed to cause collapse of the negative electrode in a high output environment, or further improve low-temperature high-rate discharge characteristics, high-temperature stability, overcharge protection, and an effect of suppressing battery swelling at high temperatures, the non-aqueous electrolyte solution for a lithium secondary battery of the present invention may further include additional additives in the non-aqueous electrolyte solution, if necessary.

As a representative example, the additional additive may include at least one additional additive selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

The cyclic carbonate-based compound may include vinylene carbonate (VC) or vinyl ethylene carbonate.

The halogen-substituted carbonate-based compound may include fluoroethylene carbonate (FEC).

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound may include ethylene sulfate (Esa), trimethylene sulfate (TMS), or methyl trimethylene sulfate (MTMS).

The phosphate-based compound may include at least one compound selected from the group consisting of lithium difluoro bis(oxalato)phosphate, lithium difluoro phosphate, trimethylsilyl phosphate, trimethylsilyl phosphite, tris(2,2,2-trifluoroethyl)phosphate, and tris(trifluoroethyl)phosphite.

The borate-based compound may include tetraphenyl borate and lithium oxalyldifluoroborate.

The nitrile-based compound may include at least one compound selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound may include fluorobenzene, the amine-based compound may include ethanolamine or ethylenediamine, and the silane-based compound may include tetravinylsilane.

The lithium salt-based compound is a compound different from the lithium salt included in the non-aqueous electrolyte solution, wherein the lithium salt-based compound may include at least one compound selected from the group consisting of $LiPO_2F_2$, LiODFB, LiBOB (lithium bis(oxalato) borate ($LiB(C_2O_4)_2$), and $LiBF_4$.

In a case in which, among these additional additives, vinylene carbonate, vinyl ethylene carbonate, or succinonitrile is included, a more robust SEI may be formed on the surface of the negative electrode during an initial activation process of the secondary battery.

In a case in which $LiBF_4$ is included, the high-temperature stability of the secondary battery may be improved by suppressing generation of gas which may be generated due to the decomposition of the electrolyte solution at high temperatures.

Two or more of the additional additives may be mixed and used, and the additional additives may be included in an amount of 0.01 wt % to 50 wt %, particularly 0.01 wt % to 10 wt %, and preferably 0.05 wt % to 5 wt % based on the total weight of the non-aqueous electrolyte solution. In a case in which the amount of the additional additives is less than 0.01 wt %, an effect of improving low-temperature output, high-temperature storage characteristics, and high-temperature life characteristics is insignificant, and, in a case in which the amount of the additional additives is greater than 50 wt %, a side reaction in the electrolyte solution may excessively occur during charge and discharge of the battery. Particularly, if the excessive amount of the additives for forming an SEI is added, the additives for forming an SEI may not be sufficiently decomposed at high temperatures so that an unreacted material may be generated in the electrolyte solution at room temperature or the additives may be present in the form of precipitates. Accordingly, a side reaction may occur in which lifetime or resistance characteristics of the secondary battery are degraded.

Lithium Secondary Battery

Also, in another embodiment of the present invention, there is provided a lithium secondary battery including the non-aqueous electrolyte solution for a lithium secondary battery of the present invention.

After an electrode assembly, in which a positive electrode, a negative electrode, and a separator disposed between the positive electrode and the negative electrode are sequentially stacked, is formed and accommodated in a battery case, the lithium secondary battery of the present invention may be prepared by injecting the non-aqueous electrolyte solution of the present invention.

The lithium secondary battery of the present invention may be prepared according to a conventional method known in the art and used, and the method of preparing the lithium secondary battery of the present invention is specifically as described below.

(1) Positive Electrode

The positive electrode may be prepared by coating a positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or two or more compounds thereof may be included. Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.), and, in consideration of a significant improvement effect due to the control of types and content ratios of components constituting the lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt %, for example, 90 wt % to 99 wt %, based on a total weight of solid content in the positive electrode slurry. In a case in which the amount of the positive electrode active material is 80 wt % or less, since energy density is reduced, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene monomer, a styrene-butadiene rubber, a fluoro rubber, various copolymers, and the like.

Also, the conductive agent is a material providing conductivity without causing adverse chemical changes in the battery, wherein it may be added in an amount of 1 wt % to 20 wt % based on the total weight of the solid content in the positive electrode slurry.

As a typical example of the conductive agent, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

Furthermore, the solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 60 wt %, for example, 20 wt % to 50 wt %.

(2) Negative Electrode

The negative electrode may be prepared by coating a negative electrode collector with a negative electrode slurry including a negative electrode active material, a binder, a conductive agent, and a solvent, and then drying and rolling the coated negative electrode collector.

The negative electrode collector generally has a thickness of 3 µm to 500 µm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \le x \le 1$), $Li_xWO_2$ ($0 \le x \le 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0<x \le 1$; $1 \le y \le 3$; $1 \le z \le 8$) may be used as the metal composite oxide.

The material, which may be doped and undoped with lithium, may include Si, $SiO_x$ ($0<x \le 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, poly tetrafluoroethylene, polyethylene, polypropylene, an ethylene-propylene-diene monomer, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the negative electrode slurry including the negative electrode active material as well as selectively the binder and the conductive agent is in a range of 50 wt % to 75 wt %, for example, 50 wt % to 65 wt %.

(3) Separator

A typical porous polymer film generally used, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator included in the lithium secondary battery of the present invention, and a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

I. Coin-Type Half Cell Preparation

Example 1

(Non-Aqueous Electrolyte Solution Preparation)

A non-aqueous electrolyte solution of the present invention was prepared by adding 1 g of the compound represented by Formula 1a to 99 g of an organic solvent (ethylene carbonate (EC):ethyl methyl carbonate (EMC)=volume ratio of 3:7) in which 1.0 M $LiPF_6$ was dissolved.

(Secondary Battery Preparation)

Lithium-nickel-cobalt-manganese oxide (Li$(Ni_{0.8}Co_{0.1}Mn_{0.1})O_2$) as positive electrode active material particles, carbon black as a conductive agent, and polyvinylidene fluoride, as a binder, were added to N-methyl-2-pyrrolidone (NMP) at a weight ratio of 97.5:1:1.5 to prepare a positive electrode slurry (solid content of 85 wt %) A 15 μm thick positive electrode collector (Al thin film) was coated with the positive electrode slurry, dried, and roll-pressed to prepare a positive electrode.

After an electrode assembly was prepared by disposing a separator formed of porous polypropylene between the positive electrode prepared by the above-described method and Li metal as a negative electrode, the electrode assembly was accommodated in a battery case, and the above-prepared non-aqueous electrolyte solution was injected to prepare a coin-type half cell.

Example 2

A non-aqueous electrolyte solution and a coin-type half cell including the same were prepared in the same manner as in Example 1 except that 1.5 g of the compound represented by Formula 1a was added to 98.5 g of the organic solvent during the preparation of the non-aqueous electrolyte solution.

Comparative Example 1

(Non-Aqueous Electrolyte Solution Preparation)

A non-aqueous electrolyte solution for a lithium secondary battery was prepared by dissolving 1.0 M $LiPF_6$ in an organic solvent in which ethylene carbonate and ethyl methyl carbonate were mixed in a volume ratio of 3:7.

(Secondary Battery Preparation)

A coin-type half cell was prepared in the same manner as in Example 1 except that the above non-aqueous electrolyte solution was used.

II. Non-Aqueous Electrolyte Solution Preparation

Example 3

A non-aqueous electrolyte solution of the present invention was prepared by adding 1 g of the compound represented by Formula 1a to 99 g of an organic solvent (ethylene carbonate (EC):ethyl methyl carbonate (EMC)=volume ratio of 3:7) in which 1.2 M LiPF$_6$ was dissolved.

Comparative Example 2

A non-aqueous electrolyte solution for a lithium secondary battery was prepared by dissolving 1.2 M LiPF$_6$ in an organic solvent (ethylene carbonate:ethyl methyl carbonate=volume ratio of 3:7).

Comparative Example 3

A non-aqueous electrolyte solution was prepared by adding 1 g of a compound represented by the following Formula 2 to 99 g of an organic solvent (ethylene carbonate (EC): ethyl methyl carbonate (EMC)=volume ratio of 3:7) in which 1.2 M LiPF$_6$ was dissolved.

[Formula 2]

Comparative Example 4

A non-aqueous electrolyte solution was prepared by adding 1 g of a compound represented by the following Formula 3 to 99 g of an organic solvent (ethylene carbonate:ethyl methyl carbonate=volume ratio of 3:7) in which 1.2 M LiPF$_6$ was dissolved.

[Formula 3]

Experimental Examples

Experimental Example 1

In a dry room, 2 of each of the coin-type half cells prepared in Examples 1 and 2 and the coin-type half cell prepared in Comparative Example 1 were put in a 25° C. thermostat for 24 hours and then subjected to 5 cycles of charging and discharging at a constant current-constant voltage (CC-CV) of 0.1 C in a voltage range of 3.00 V to 4.25 V (vs. Li/Li$^+$). In this case, a current termination condition of CV was set to 0.05 C. After the 5 cycles of charging and discharging were performed, the coin-type half cells were charged at 4.25 V at room temperature under the same conditions, an OCV (open-circuit voltage) was measured every 15 hours, 30 hours, and 45 hours while the coin-type half cells were put in a 60° C. high-temperature chamber, and the results thereof are presented in FIG. 1 to confirm self-discharge rates.

Figure 1:
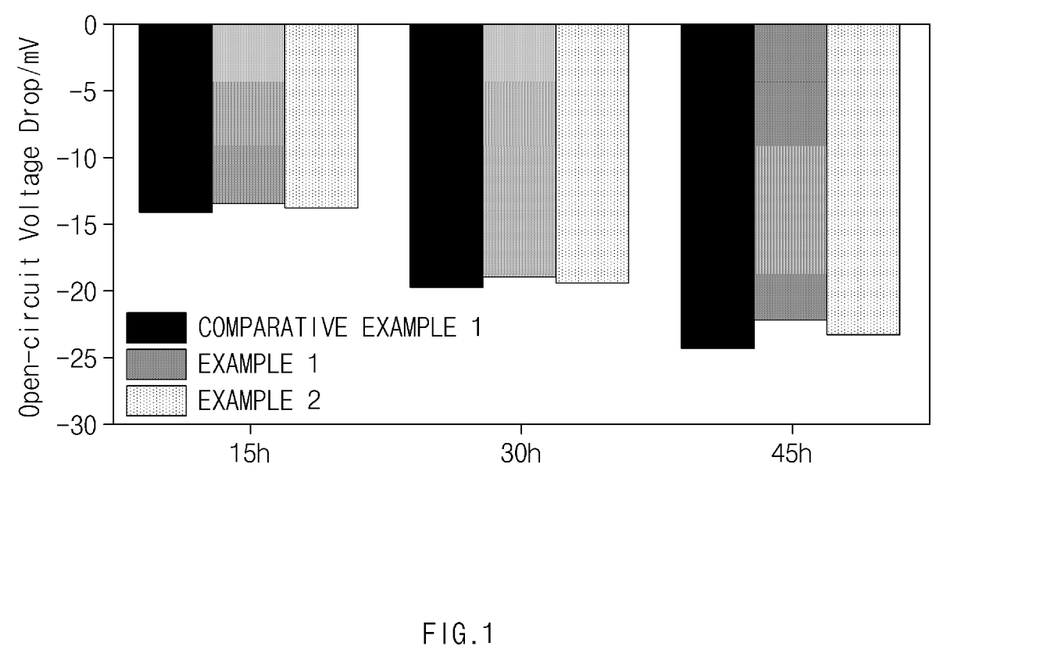
FIG. 1 is a graph illustrating the results of evaluating a degree of reduction in open-circuit voltage (OCV) of cells during high-temperature storage in Experimental Example 1 of the present invention.

Referring to FIG. 1, with respect to the coin-type half cells prepared in Examples 1 and 2, voltage drops were less than −23 mV even after 45 hours after the high-temperature storage, but, with respect to the coin-type half cell of Comparative Example 1 which included the non-aqueous electrolyte solution without an additive, it may be understood that a voltage drop was greater than −24 mV after 45 hours after the high-temperature storage. In a case in which the voltage drop was relatively large, it denoted that self-discharge of the positive electrode was severe and capacity was degraded.

Based on these results, it may be understood that, with respect to the coin-type half cells prepared in Examples 1 and 2, self-discharge of the battery was alleviated by a Lewis base compound included in the non-aqueous electrolyte solution.

With respect to the secondary battery of Example 2 which included the non-aqueous electrolyte solution containing 1.5 wt % of the additive in comparison to the secondary battery of Example 1 containing 1.0 wt % of the additive, the voltage drop was relatively improved in comparison to that of Comparative Example 1, but it may be understood that the voltage drop was relatively slightly increased in comparison to that of the secondary battery of Example 1, because resistance of the electrode was increased while an amount of the additive decomposed was increased.

Experimental Example 2. Metal (Mn) Dissolution Evaluation

A LiMn$_2$O$_4$ positive electrode was immersed in each of the non-aqueous electrolyte solutions for a lithium secondary battery which were prepared in Example 3 and Comparative Examples 2 to 4, and stored at 60° C. for 2 weeks at a state of charge (SOC) of 0%.

After 2 weeks, a concentration of metal (Mn) dissolved in each non-aqueous electrolyte solution was measured using an inductively coupled plasma optical emission spectrophotometer (ICP-OES). Subsequently, amounts of the metal measured by ICP analysis are presented in FIG. 2.

Figure 2:
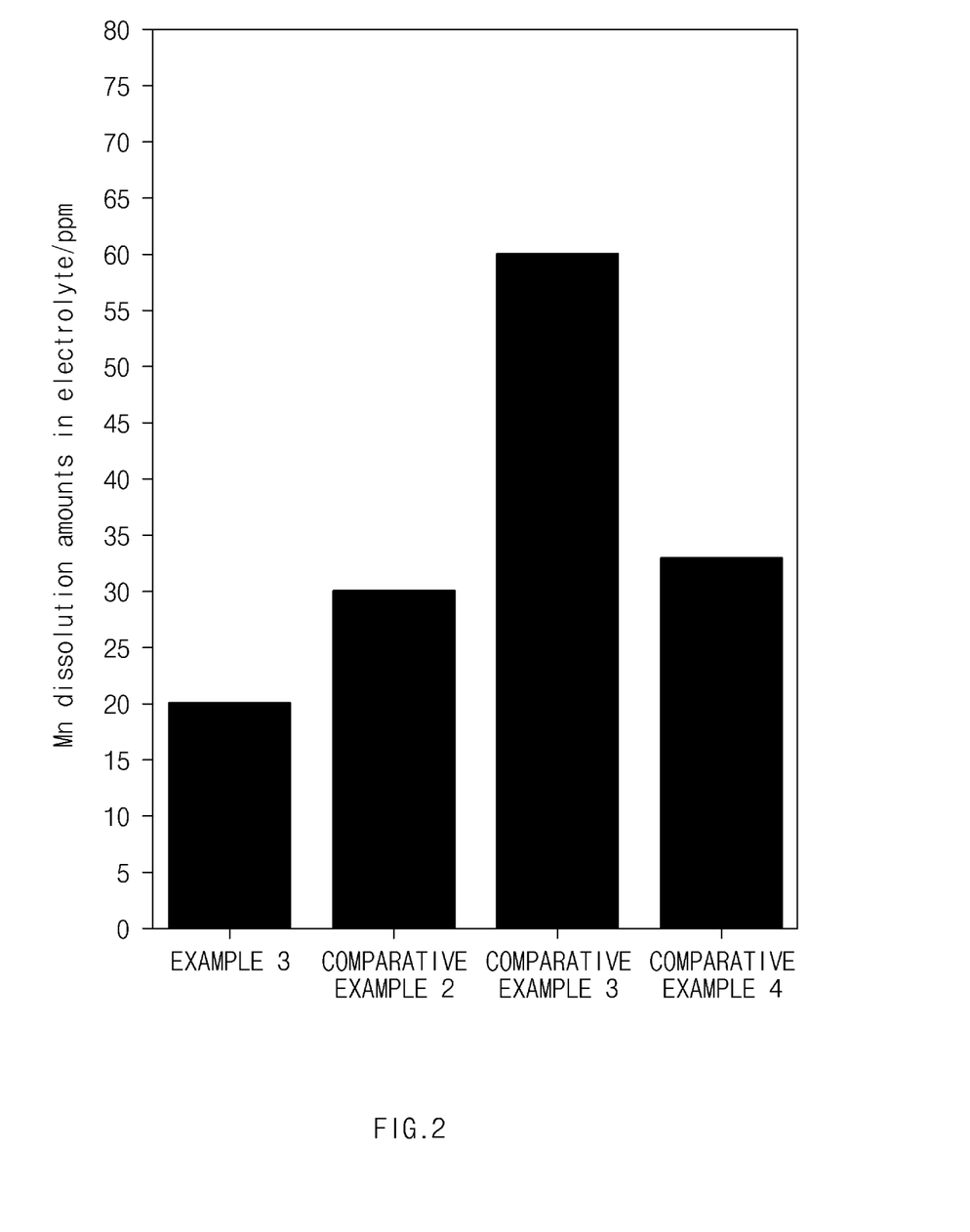
FIG. 2 is a graph illustrating the results of evaluating metal dissolution according to Experimental Example 2 of the present invention.

Referring to FIG. 2, it may be understood that Mn ions were dissolved at a concentration of about 20 ppm in the non-aqueous electrolyte solution of Example 3 containing the compound of the present invention.

In contrast, an amount of Mn ions dissolved in the non-aqueous electrolyte solution of Comparative Example 2 not containing an additive was 30 ppm, and an amount of Mn ions dissolved in the non-aqueous electrolyte solution of Comparative Example 4 containing the compound represented by Formula 3 was 33 ppm, wherein it may be confirmed that the amounts of the Mn ions dissolved were increased in comparison to that of the non-aqueous electrolyte solution of Example 3.

Particularly, an amount of Mn ions dissolved in the non-aqueous electrolyte solution of Comparative Example 3 containing the compound represented by Formula 2 was 60 ppm, wherein it may be understood that the amount of the Mn ions dissolved was significantly increased in comparison to that of the non-aqueous electrolyte solution of the present invention.

From these results, since the non-aqueous electrolyte solution of Example 3 containing the Lewis base compound removed factors, which may attack the positive electrode, by removing Lewis acid generated during high-temperature storage, it may be understood that a metal dissolution suppression effect was improved in comparison to those of the lithium secondary batteries of Comparative Examples 2 to 4.

The invention claimed is:

1. A non-aqueous electrolyte solution for a lithium secondary battery, the non-aqueous electrolyte solution comprising a lithium salt, an organic solvent, and a compound represented by Formula 1 as an additive:

[Formula 1]

wherein, in Formula 1,
$R_1$ to R6 are each independently hydrogen or a substituted or unsubstituted alkyl group having 1 to 10 carbon atoms, and
$R_7$ is a substituted or unsubstituted alkyl group having 1 to 10 carbon atoms.

2. The non-aqueous electrolyte solution for a lithium secondary battery of claim 1, wherein the lithium salt comprises $Li^+$ as a cation, and comprises at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2 N^-$ as an anion.

3. The non-aqueous electrolyte solution for a lithium secondary battery of claim 1, wherein the organic solvent comprises a carbonate-based organic solvent.

4. The non-aqueous electrolyte solution for a lithium secondary battery of claim 1, wherein, in Formula 1, $R_1$ and $R_5$ are hydrogen, $R_3$ and $R_4$ are each independently a substituted or unsubstituted alkyl group having 1 to 7 carbon atoms, $R_2$ and $R_6$ are each independently hydrogen or a substituted or unsubstituted alkyl group having 1 to 5 carbon atoms, and $R_7$ is a substituted or unsubstituted alkyl group having 1 to 7 carbon atoms.

5. The non-aqueous electrolyte solution for a lithium secondary battery of claim 1, wherein, in Formula 1, $R_1$ and $R_5$ are hydrogen, $R_3$ and $R_4$ are each independently a substituted or unsubstituted alkyl group having 1 to 5 carbon atoms, $R_2$ and $R_6$ are each independently hydrogen or a substituted or unsubstituted alkyl group having 1 to 3 carbon atoms, and $R_7$ is a substituted or unsubstituted alkyl group having 1 to 5 carbon atoms.

6. The non-aqueous electrolyte solution for a lithium secondary battery of claim 1, wherein, in Formula 1, $R_1$, $R_2$, $R_5$, and $R_6$ are hydrogen, $R_3$ and $R_4$ are each independently a substituted or unsubstituted alkyl group having 1 to 3 carbon atoms, and $R_7$ is a substituted or unsubstituted alkyl group having 1 to 3 carbon atoms.

7. The non-aqueous electrolyte solution for a lithium secondary battery of claim 1, wherein the compound represented by Formula 1 comprises a compound represented by Formula 1a:

[Formula Ia]

8. The non-aqueous electrolyte solution for a lithium secondary battery of claim 1, wherein the compound represented by Formula 1 is included in an amount of 0.1 wt % to 2 wt % based on a total weight of the non-aqueous electrolyte solution.

9. The non-aqueous electrolyte solution for a lithium secondary battery of claim 8, wherein the compound represented by Formula 1 is included in an amount of 0.1 wt % to 1.7 wt % based on the total weight of the non-aqueous electrolyte solution.

10. A lithium secondary battery comprising the non-aqueous electrolyte solution of claim 1.

* * * * *